US006960991B2

(12) United States Patent
Orcifalvi et al.

(10) Patent No.: US 6,960,991 B2
(45) Date of Patent: Nov. 1, 2005

(54) ELECTRONICALLY TESTED HIGH-SECURITY CODING AND DECODING DEVICE

(75) Inventors: Vilmos Orcifalvi, Budapest (HU); Otto Wallner, Halasztelek (HU)

(73) Assignee: Danubia IP Innovacios Tanacsado Kft, Budapest (HU)

( * ) Notice: Subject to any disclaimer, the term of this patent is extended or adjusted under 35 U.S.C. 154(b) by 0 days.

(21) Appl. No.: 10/482,829

(22) PCT Filed: Jun. 26, 2002

(86) PCT No.: PCT/HU02/00058

§ 371 (c)(1), (2), (4) Date: Dec. 31, 2003

(87) PCT Pub. No.: WO03/004807

PCT Pub. Date: Jan. 16, 2003

(65) Prior Publication Data

US 2004/0239479 A1 Dec. 2, 2004

(30) Foreign Application Priority Data

Jul. 2, 2001 (HU) ............................................ 0102737

(51) Int. Cl.[7] ................................................ B60R 25/10
(52) U.S. Cl. ................... 340/426.35; 340/5.6; 70/278.2
(58) Field of Search ........................... 340/426.35, 5.67, 340/5.72, 5.6, 5.2, 5.7, 5.1; 70/278.3, 278.2

(56) References Cited

U.S. PATENT DOCUMENTS 3,786,741 A * 1/1974 Hochman et al. .......... 340/5.23
4,392,134 A * 7/1983 Lutz .......................... 340/5.67
5,237,311 A * 8/1993 Mailey et al. .............. 345/167
5,289,177 A * 2/1994 Wake ........................ 340/5.67
5,337,043 A * 8/1994 Gokcebay .................. 340/5.67
5,677,682 A * 10/1997 Thorsen et al. ............ 340/5.65
5,691,711 A * 11/1997 Jorgensen .................. 340/5.67
6,411,195 B1 * 6/2002 Goldman .................... 340/5.1

* cited by examiner

*Primary Examiner*—Anh V. La
(74) *Attorney, Agent, or Firm*—Welsh & Katz, Ltd.; Thomas R. Vigil

(57) ABSTRACT

The invention relates to an electronically tested high-security coder/decoder device, comprising a key (1) consisting of a mechanically produced code, a body with integrated interpretation and actuation unit (2) and an electronic processing device (3) connected thereto. The key (1) has at least one pressure generator and pressure sensor unit (12) with code producing pressure elements (121, 122, 12*n*) and with one pressure transmitting part each. The interpretation and actuation unit (2) is provided with a unit (22) that converts pressure values known as such to electrical signals, an authorization unit (23) and an exe (24). The conversion unit (22) has an input (221) and an output (22). The output (22) is connected to the input (311) of the central processing unit (31). The central processing unit (31) and the interface (32) cooperate to give the electronic processing unit (3). The interface output (322) is connected to the input (232) of the authorization unit (23) whose output (231) is connected to the input (241) of the execution unit (24).

14 Claims, 2 Drawing Sheets

ELECTRONICALLY TESTED HIGH-SECURITY CODING AND DECODING DEVICE

BACKGROUND OF THE INVENTION

1. Field of the Invention

The present invention relates to an electronically monitored, high-security, coder-decoder device, which can preferably be used on various locks, lock inserts, banking equipment and in all other cases where a close-open (correct-incorrect) state can be detected and evaluated and, as a consequence, can be operated as an appropriate executing unit.

2. Description of the Related Art

It is common knowledge that there are numerous solutions for making lock inserts with increased security. Such solutions include the KABA Benzing electric cylinder inserts and keys, for which the electronics (Elektronischer Schlussel KABA nova) are disposed in the head of the key and the flat sides and edges of the body follow complex etched lines. With this solution, coding is effected via the complex simultaneous movement of the parts within the lock, which allows the lock to be opened and ensures that it is both difficult and time-consuming to copy the key. Further information on this solution and on the master and control key systems can be found in the publication associated with the order number 32.205-0.67/296. The deficiencies in this solution are that the surface tooling works of the key are complicated, the lock employs a large number of insert bars and the numerous electronic parts built into the key are vulnerable and the recorded code may be reproduced after it has been made.

There also exist coder/decoder circuits that serve primarily to decode electric pulses created in association with television, video and audio signals, digital information, data, and the coded signals that carry telephone numbers are read (such as the solution described in the HU patent specification with application number P8705247); however, such circuits are not suitable for use with various locks, lock inserts, and banking equipment.

Another technical solution is represented by the key-lock combination distributed by the company OMRON, for which the electronics is disposed within the key. The deficiency in this solution is that the key may be copied and anyone (including unauthorised persons) may use it.

The objective of the present invention is to eliminate the deficiencies inherent in these known solutions and to create an electronically monitored, high-security coder/decoder device, wherein the key can be produced from easily available materials in a simple way and without the use of electric parts; which employs an adaptive coding, such that the device identifies itself in a secure way, wherein the code is defined by mechanical elements and being associated with pressure compensation and cannot be copied; each key employs only a single code but this can be used to operate several "trained" decoders; for which faults caused by temperature changes and wear may be corrected continuously; and which is economic to manufacture.

BRIEF DESCRIPTION OF THE INVENTION

The solution according to the invention is based on the recognition that if we create an electronically monitored, high-security coder/decoder device that comprises a body and a key carrying a mechanically produced code, a reading/ operating unit disposed in the body, and an electronic processing unit connected to this unit, wherein the key includes at least a pressure-coding unit, in which the containing pressure values comprises n elements, the reading/operating unit comprises a pressure sensor/electric signal converter unit and an executing unit; the pressure sensor/electric signal converter unit has an input and an output; the output is coupled to one of the inputs of an electronic processing unit, which consists of a central control unit and an interface; the output of an approval unit is connected to the input of the executing unit; the input of the approval unit is connected to an output of the interface; the input/output group of lines of the central control unit being connected to the group of input/output lines of the interface; the central control unit has a second input and the interface has an optional input/output line group, so that a pressure code is generated, which is not precisely known from the key, and the reading/operating unit together with the electronic processing unit learning in an adaptive fashion by sensing and storing the pressure code of the key, whereby an electronically monitored, high-security coder/decoder device is constituted that has a key that can be manufactured easily from materials that are easy to procure and without the use of electric parts; which employs an adaptive coding, such that the device identifies itself in a secure way; the mechanically produced code supplemented with a pressure compensation cannot be copied, wherein each key employing only a single code but may be used to operate several "trained" decoders, and errors caused by changes in temperature and wear can be corrected continuously; and which is economic to manufacture.

A further object of the invention is an electronically monitored, high-security coder/decoder device, comprising a body and a key including a mechanically produced code, the body comprises a reading/operating unit and an electronic processing unit connected to the reading/operating unit. The essence of the invention lies in that the key comprises at least one pressure value code generator/transmitter unit, containing n pressure value elements, whose function is to produce a code series, and that each pressure value element has a part that transmits this pressure.

The reading/operating unit comprises a per-se known pressure sensor/electric signal converter unit, an approval unit and an executing unit. The pressure sensor/electric signal converter unit has an input and an output, with the output connected to one of the inputs of the central control unit of the electric processing unit, which itself comprises the central control unit and an interface, the output of the approval unit is connected to the input of the executing unit, the input thereof is connected to the output of the interface, and the input/output line group of the central control unit is connected to the input/output line group of the interface. The central control unit has a second input, and the interface has an optional input/output line group.

In a preferred embodiment of the device according to the present invention, the central control unit of the electronic processing comprises a function analyser operating proportional to the pressure, a self-learning adaptive unit, an intelligent code comparator, a storage unit and an evaluating unit.

The adaptive unit, the intelligent code comparator, the storage unit and the evaluating unit can be disposed at a physically separate location from the central control unit depending on how the device is used. The output of the function analyser is connected to the input of the adaptive unit, to the input of the storage unit and to the input of the intelligent code comparator, the output of the adaptive unit is connected to the input of the storage unit, the output of the storage unit is connected to the other input of the intelligent code comparator, and the output of the intelligent code comparator to the input of the evaluating unit. The input/output line group of the evaluating unit functions simultaneously as the input/output line group of the central control unit.

In another preferred embodiment of the device according to the present invention for use in cylinder lock inserts, the key is made of a metal or a plastic material, and the device comprises a pressure value code generator/transmitter unit. The pressure value components disposed within the drill-holes are springs, between 6 and 10 in number, preferably seven, and the parts that transmit pressure, have the same number and these parts are balls, and for sealing off the drill-holes, the pressure value code generator/transmitter unit has pins in a number equal to the number of pressure value components.

In a further preferred embodiment of the device according to the present invention for use in cylinder lock inserts, the receiving body for the reading/operating unit is cylindrical in shape and is equipped with a keyhole of a simple geometry. The pressure sensor/electric signal converter unit is preferably a piezoelectric sensor or an expansion sensor gauge, the enabling unit is an electromechanical locking/unlocking apparatus, preferably a relay, and the executing unit is a bolt feeder.

In another preferred embodiment of the device according to the present invention for use in banking equipments, the receiving body for the reading/operating unit has a shape depending on the mode of use, and being provided for sensing the codes disposed on both sides of the key with respective pressure sensor/electric signal converter units, and the enabling unit is of an electronic type, and the executing unit is a automatic teller machine.

BRIEF DESCRIPTION OF THE SEVERAL VIEWS OF THE DRAWINGS

Further details of the electronically monitored, high-security coder/decoder device according to the present invention will be described with reference to the drawings, as follows.

DESCRIPTION OF THE PREFERRED EMBODIMENTS

Figure 1:
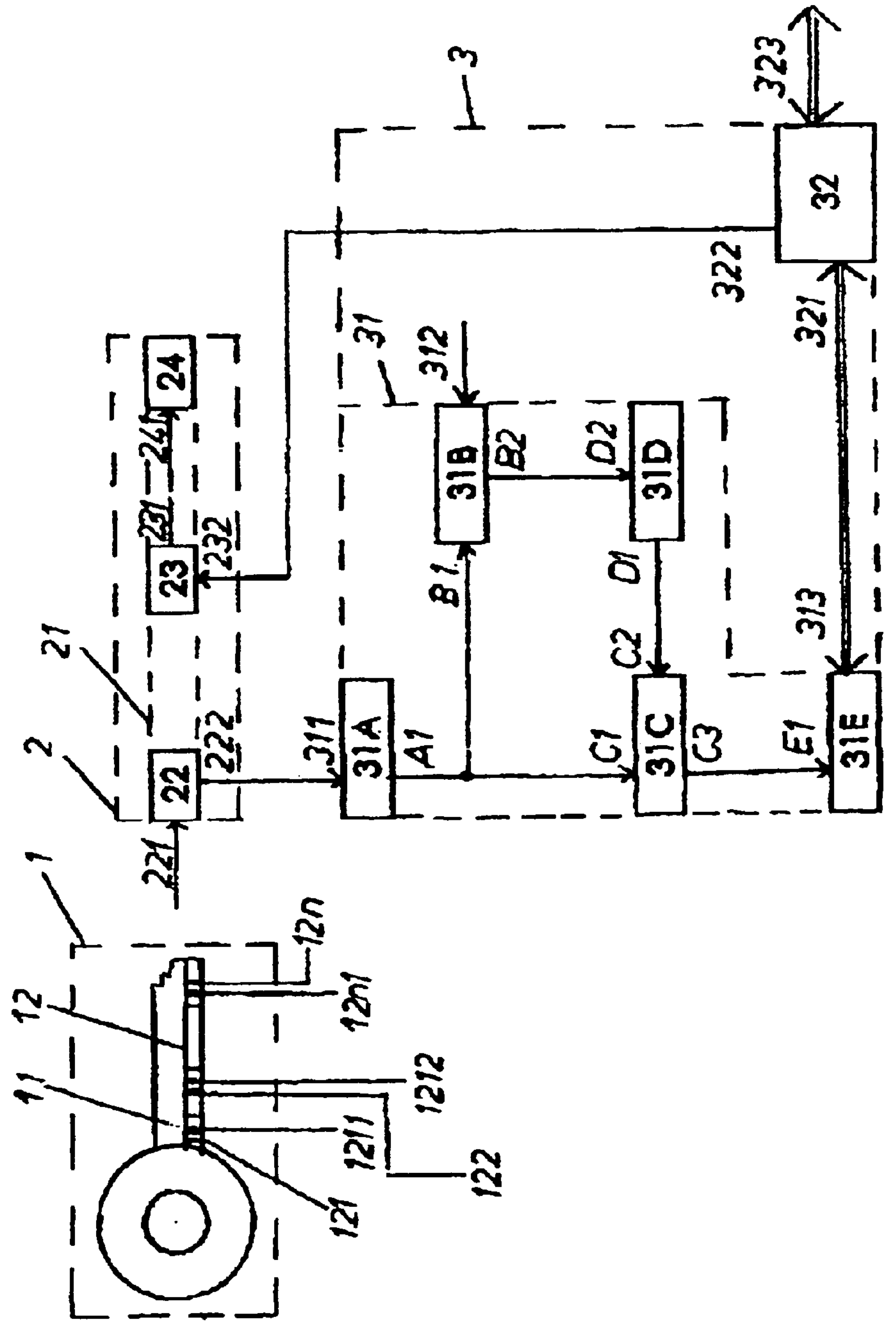
FIG. 1 is a conceptual assembly drawing of the electronically monitored, high-security coder/decoder device according to the invention.

FIG. 1 shows a schematic assembly drawing of the electronically monitored, high-security coder/decoder device according to the invention. The device has a key 1, with a body 11, a receiving body 21 in a reading/operating unit 2 being connected to an electronic processing unit 3. The key 1 is equipped with at least one pressure value code generator/transmitter unit 12, which contains n pressure value elements 121, 122, . . . , 12*n* generating together a code series, and each pressure value element 121, 122, . . . , 12*n* has a pressure transmitting part 1211, 1221, . . . , 12*n*1. The reading/operating unit 2 comprises a conventionally designed pressure sensor/electric signal converter unit 22, an [approval] enabling unit 23 and an executing unit 24. The pressure sensor/electric signal converter unit 22 has an input 221 and an output 222. The output 222 is connected to an input 311 of an electronic processing unit 3, comprising a central control unit 31 and an interface 32. An output 231 of the enabling unit 23 is connected to an input 241 of the executing unit 24, an input 232 of the enabling unit 24 is connected to an output 322 of the interface 32, and the input/output line group 313 of the central control unit 31 is connected to the input/output line group 321 of the interface 32. The central control unit 31 has a second input 312 and the interface 32 has an optional input/output line group 323. The central control unit 31 of the electronic processing unit 3 has a function analyser 31A that analyses preferably the pressure pattern, an adaptive unit 31B, an intelligent code comparator 31C, a storage unit 31D, and an evaluating unit 31E. The adaptive unit 31B, the intelligent code comparator 31C, the storage unit 31D, and the evaluating unit 31E can be placed in a location that is physically separate from the central control unit 31, depending on the mode of use. An output A1 of the function analyser 31A is connected to the input B1 of the adaptive unit 31B and one of the inputs C1 of the intelligent code comparator 31C. An input D2 of the storage unit 31D is connected to output B2 of the adaptive unit 31B. Output D1 of the storage unit 31D is connected to a second input C2 of the intelligent code comparator 31C, and output C3 of the intelligent code comparator 31C is connected to input E1 of the evaluating unit 31E. Finally, the input/output line group of the evaluating unit 31E functions simultaneously as the input/output line group 313 of the central control unit 31.

Figure 2:
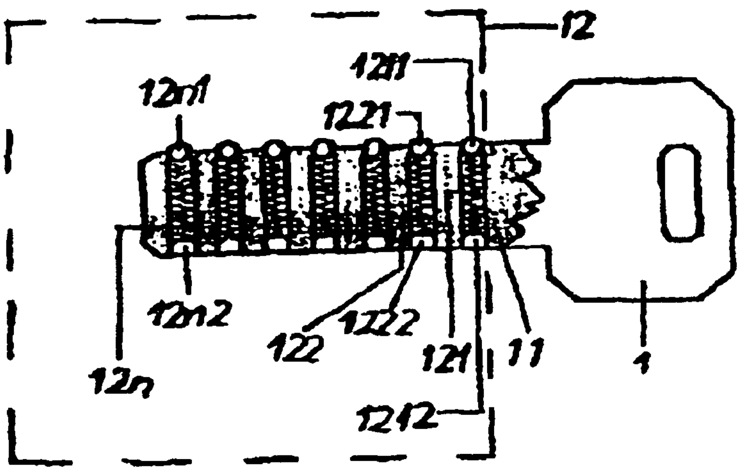
FIG. 2 shows a side-view of a preferred embodiment of the key for use in cylinder lock inserts.

FIG. 2 shows the cross sectional side view of a preferred embodiment of the key 1 for use with cylinder lock inserts. In this embodiment the key 1 has preferably a pressure value code generator/transmitter unit 12. The pressure value elements 121, 122, . . . , 12*n* are springs disposed in drill-holes and their number is preferably seven (n=7). The pressure transmitting parts of the same number 1211, 1221, . . . , 12*n*1 are balls, while for sealing off the drill holes, the pressure value code generating/transmitting unit 12 has pins 1212, 1222, . . . , 12*n*2 of a number equal to the number of pressure value elements 121, 122, . . . , 12*n*1.

Figure 3:
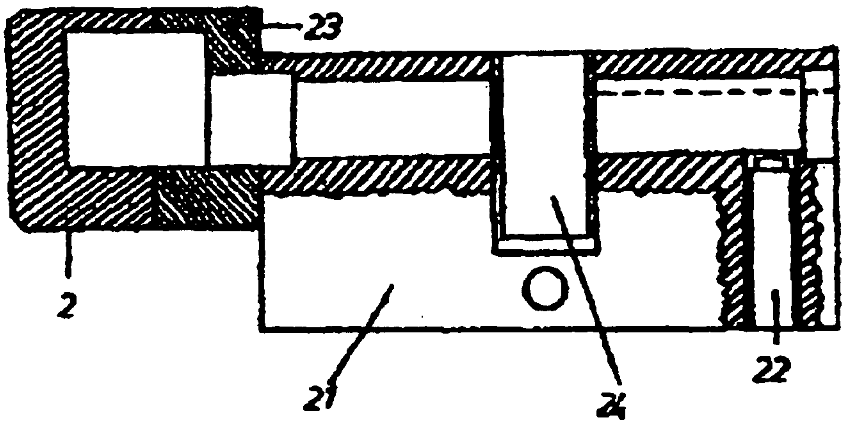
FIG. 3 shows a side-view of a preferred embodiment of the reading/operating unit for use in cylinder lock structures.

FIG. 3 shows a side view in cross section of a preferred embodiment of the reading/operating unit 2 for use in cylinder lock inserts. In this embodiment the reading/operating unit 2 has a receiving body 21 that has a size and shape as prescribed by international standards. The cylinder has a keyhole with a simple geometry. The pressure sensor/electric signal converter unit 22 is expediently a piezoelectric sensor or a tension gauge, the enabling unit 23 is an electromechanical locking/unlocking apparatus, preferably a relay, and the executing unit 24 is a bolt feeder.

Figure 4:
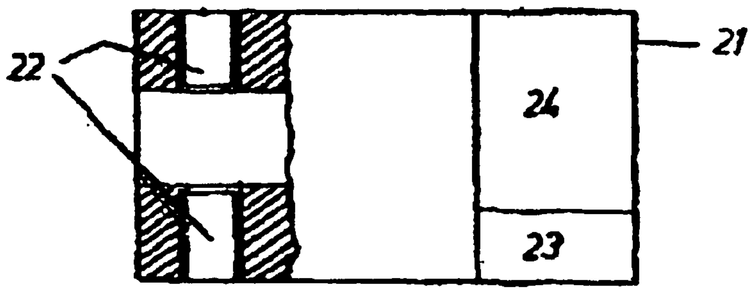
FIG. 4 shows a side-view of a preferred embodiment of the reading/operating unit for use with banking equipment.

FIG. 4 shows a side view, in cross section, of a preferred embodiment of the reading/operating unit 2 for use in banking equipment. In this embodiment, the receiving body 21 of the reading/operating unit 2 is of a shape depending on the mode of use, and for sensing the codes disposed on both sides of the key 1 the device comprises preferably two pressure sensor/electric signal converter units 22, furthermore, the enabling unit 23 is an electronic device and the executing unit 24 is an automatic teller machine.

The electronically monitored, high-security coder/decoder device according to this invention functions as follows:

As the key 1 is inserted into the lock, the changing pressure signals generated by the n pressure transmitter parts 121, 122, . . . , 12*n* of the pressure code generator/transmitter unit 12 disposed within the key 1 and correspond to a specific pattern, these parts reach the input 221 of the pressure sensor/electric signal converter unit 22 and this unit 22 senses the varying pressure values. At the output 222 of the pressure sensor/electric signal converter unit 22 an analogue signal is generated that is proportional to the pressure values arising as the key 1 is introduced into the lock. This signal is filtered by the analogue signal converter and sent to the input 311 of the electronic processing unit 3. This signal reaches the function analyser 31A of the central control unit 31, which performs a digital filtering operation and determines the characteristic values of the pressure function, then stores these values into a temporary memory.

The electronic processing unit 3 carries out any correction required due to temperature changes and wear. The analogue signal present at the output A1 of the function analyzer 31A is then passed both to the input B1 of the adaptive unit 31B and one of the inputs C1 of the intelligent code comparator 31C.

The codes, which correspond to the selected key 1 are stored through the programming input 312 of the central control unit 31, forming also the input 312 of the adaptive unit 31B. The process occurs such that the selected key 1 is inserted into the reading/operating unit 2, and the executing unit 24 provides the opening of this unit 2. When the correct password is given, the code is stored in the storage unit 31D through the output B2 of the adaptive unit 31B, rendering that particular key 1 usable thereafter. The intelligent code comparator 31C compares the value stored in the temporary memory of the function analyzer 31A and forwarded to the input C1 with the earlier stored learned value passed to its other input C2. If the values agree, then an enabling signal is sent through the output C3 to the input E1 of the evaluating unit 31E. The evaluating unit 31E, depending on the actual mode of use, determines and prepares the signals and information necessary for the interface 32 to continue operating and processing, and sends them to its input/output line group 313. A control signal appears at the output 322 of the interface 32, which is sent to the input of the enabling unit 23. If the actual value of the code is equal to the taught value, i.e. if the code is correct, then the enabling signal reaches the output 231 of the enabling unit 23, which then proceeds as an operating signal to the input 241 of the operating unit 24 and gives the operating unit 24 the command to release the lock and allow it to be opened.

The interface 32 comprises an optional input/output line group 323, through which information such as light signals or, in case of an intrusion, alarm or other alert signals can be sent. In case of an unauthorized entry-attempt an alarm report can also be sent through either a mobile or conventional telephone, or the system can be connected directly to the police or to any other security or monitoring organization. An external computer or a telephone modem can also be connected to the optional input/output line group 323, through which the device can be programmed or certain approval signals can be sent or certain keys 1 can be blocked or enabled. For use in hotels, the doors can be connected on-line to a computer and code reader located at the reception desk, so that when the receptionists provides a guest with a key 1, the validity of the code of the key 1 of that room can be defined for the period until the guest checks out. In this way the users can create independent master and service key systems and can make changes to meet individual needs. With master and service key systems both the opening and closure times can be recorded and retrieved or the bearers of the key 1 can be identified. A code can be selected after the password has been given and a key 1 has been inserted into the reading/operating unit 2; the adaptive unit 31B requires information on the associated memory cell or, in case of hotels, through on line or telephone connections a one-time opening of the lock can be permitted, e.g. when a caretaker must be let in to see to a burst pipe. If a key 1 is lost or gets stolen, the code can be inactivated by telephone.

Depending on the mode of use, the adaptive unit 31B, the intelligent code comparator 31C, the storage unit 31D and the evaluating unit 31E can be arranged at physically separate locations from that of the central control unit 31. In such cases the separate units can be operated through the optional input/output line group 323 (e.g. when the device is used for banking applications).

With the electronically monitored, high-security coder/decoder device according to the present invention, the pressure-coded key 1 can be made in several designs. The key 1 can be made to have pressure-coded/pressure transmitting elements at both sides in any required form e.g. tubular, disc-shaped, etc. The material of the key 1 can be a cheap metal or plastic. Such keys can be used preferably in hotels. The device does not include any electric parts, it is not fragile but is disposable, and can be manufactured simply and economically. The creation of the pressure or pressure function can occur by using pressure value components 121, 122, . . . , 12*n* that allow for secure coding, including solutions employing springs, magnets, balls, or pneumatic or hydraulic solutions, etc. that can provide the possibility of secure coding. Depending on the solution chosen and on the actual design employed, various mechanical parts can be used (including pins, springs, balls, threaded bolts, magnets, etc.). The number of the pressure value elements 121, 122, . . . , 12*n* can be selected depending on the number of segments in the code. For general use, the number of pressure value components 121. 122, . . . 12*n* can be between 6 and 10.

The actual design of the reading/operating unit 2 depends on the selected mode of use. This unit 2 can be placed in a location relatively far from the place of operation. For doors and safes it would be a cylinder lock insert, a non-cylinder lock, a safe lock, etc., while for banking equipment, depending on the specific application, it can be e.g. a code reader unit. For use in cylinder lock inserts, the reader/operating unit 2 can also be manufactured in several designs, and the pressure sensor/electric signal converter unit 22 can be e.g. a piezoelectric sensor, possibly including a pressure transmitting element such as a spring providing also a pressure compensation. The pressure compensation can be achieved by using either a counter-pressure or a tension redactor. The enabling unit 23 is an electromechanically designed locking/unlocking apparatus controlled either manually or automatically. In a preferred embodiment, a relay or a motor may be used. The executing unit 24 can be e.g. a bolt feeder or a similar device that can ensure that the locked apparatus (door, safe, locker, money in an automatic teller machine) be opened and the objects it safeguards be accessed only at a given place and time by a specified individual. The reader/operating unit 2 may also employ various electronic or mechanical elements, depending on use (e.g. a mechanical opening element for use with a cylinder lock insert).

The electronically monitored, high-security coder/decoder device according to the present invention fulfils all set objectives and offers the following advantages:

the code is built into the key only and cannot be copied, coding occurs securely and adaptively, in self-identifying fashion, each key is associated with a respective code, so that of keys randomly produced (nearly 17 million planned variations), the user may choose any and may use it to his/her own reading/operating unit, production errors increase the number of code variations, the electronic processing unit corrects discrepancies resulting from temperature changes or wear, a single key can be used to operate as many "trained" reader/operating units as desired, manufacture is both simple and economical.

What is claimed is:

1. An electronically monitored, high-security, coder/decoder apparatus, comprising a key having a body and a mechanically produced code; a receiving body; a reader/operating unit arranged within the receiving body; and an electronic processing unit connected to the reader/operating unit, characterized in that the key (1) comprises at least one pressure value code generator/transmitter unit (12) having n pressure value elements **(121, 122, . . . , 12*n*) for generating a code series, wherein said reader/operating unit (2) comprises a per se known pressure sensor/electric signal converter unit (22), an enabling unit (23) and an executing unit (24), the pressure sensor/electric signal converter unit (22) has an input (221) and an output (222), wherein the output (222) is connected to an input (331) of the electronic processing unit (3) that comprises a central control unit (31) and an interface (32), the output (231) of the enabling unit (23) is connected to the input of the executing unit (24), the input (232) of the enabling unit (23) is connected to the output (322) of the interface (32), an input/output line group (331) of the central control unit (31) is connected to the input/output line group (321) of the interface (32), the central control unit (31) comprises a second input (312) and the interface (32) has an optional input/output line group (323), and further that the central control unit (31) of the electronic processing unit (3) comprises a function analyzer (31) operating proportional to the pressure and associates a digital code value to the actual value of the output signal of the pressure sensor/electric signal converter unit (22), an adaptive unit (31B), an intelligent code comparator (31C), a storage unit (31D), and an evaluating unit (31E); wherein depending on the mode of use the adaptive unit (31B), the intelligent code comparator (31C), the storage unit (31D) and the evaluating unit (31E) can be placed in a location physically separate from that of the central control unit (31); the output (A1) of the function analyzer (31A) is connected to the input (B1) of the adaptive unit (31B) and one of the inputs (C1) of the intelligent code comparator (31C), the input (D2) of the storage unit (31D) is connected to the output (B2) of the adaptive unit (31B), the output (D1) of the storage unit (31D) is connected to the other input (C2) of the intelligent code comparator (31C), and the output (C3) of the intelligent code comparator (31C) is connected to the input (E1) of the evaluating unit (31E); and the input/output line group of the evaluating unit (31E) functions simultaneously as the input/output line group (313) of the central control unit (31)**.

2. The apparatus according to claim 1, characterized in that for applications in cylinder lock inserts the body (11) of the key (1) is made of a metal or plastic material, and the apparatus comprises preferably a single pressure value code generator/transmitter unit (12), and the number of the pressure value elements **(121, 122, . . . , 12*n*)** being disposed in respective drill-holes, in said key body and being biased by respective springs determining the actual pressure value associated with said element and the number of said pressure value elements is between 6 and 10.

3. The apparatus according to claim 1, characterized in that, for applications in cylinder lock inserts, the receiving body (21) of the reader/operating unit (21) is of a size and shape as specified by international standards, the cylinder comprises a keyhole with a simple geometry, and the pressure sensor/electric signal converter unit (22) is expediently a piezoelectric sensor, the enabling unit (23) is an electromechanical locking/unlocking apparatus, preferably a relay, and that the enabling unit (24) comprises a bolt feeder.

4. The apparatus according to claim 1, characterized in that, for use in banking applications the receiving body (21) for the reader/operating unit (2) is of a shape depending on the mode of use, that for the detection of the codes on both sides of the key (1) at each side respective pressure sensor/electric signal converter units (22) being provided, said enabling unit (23) having an electronic design and said executing unit (24) being an automatic teller machine.

5. An apparatus for providing an electronically controlled access, comprising a key and an access unit defining an insertion path for said key, a key body, said key body comprising a coding device with a predetermined number of discrete coding elements arranged along the insertion path of said key and each being capable of providing a respective code as a pressure value, said coding elements each having substantially identical form and defining together a unique combination of pressure codes; said access unit comprising a lock body defining a channel for receiving said key when said key is introduced into said channel; a decoder designed as a pressure/electric signal transducer arranged at said channel so that during insertion of said key into said channel said transducer is exposed sequentially to said pressure values of said coding elements and providing a decoded signal sequence representing said unique combination; a code memory storing a predetermined number of reference codes, a code comparator comparing said decoded signal sequence with said reference codes for delivering an enable signal if identity is found; and an actuator for providing said access in response to said enable signal.

6. The apparatus as claimed in claim 5, characterized in that said key comprising a plurality of said coding devices, each having a respective set of said coding elements, and in said decoder respective ones of said pressure/electric signal transducers are associated with each one of said coding devices.

7. The apparatus as claimed in claim 5, characterized in that said key for said different coding devices have identical shape and appearance.

8. The apparatus as claimed in claim 5, characterized in that said key body has bores therein and said coding elements are arranged in respective bores defined in said key body.

9. The apparatus as claimed in claim 5, characterized in that said coding elements are springs or magnets.

10. The apparatus as claimed in claim 5, characterized in that said pressure/electric signal transducer is a piezoelectric transducer.

11. The apparatus as claimed in claim 5, characterized in that said reference code is written in said code memory from the output of said decoder in response to the insertion of said key prior to the first authorized use of the key.

12. The apparatus as claimed in claim 5, characterized by comprising a processing unit coupled to said actuator and to said reference memory for storing additional data influencing the validation of said enable signal.

13. A key for use in an apparatus for providing an electronically controlled access as claimed in claim 5, comprising a key body, said key body comprising a coding device with a predetermined number of coding elements arranged along the insertion path of said key and each coding element is capable of providing a respective pressure, said coding elements together defining a unique combination of pressure codes.

14. The key as claimed in claim 5, characterized in that said coding elements have identical appearance.

* * * * *